(12) United States Patent
Tanaka et al.

(10) Patent No.: US 8,467,091 B2
(45) Date of Patent: Jun. 18, 2013

(54) PRINT LABEL EDITING APPARATUS ENABLING OPERATOR TO EDIT THE PRINT CONTENTS FOR A PRINT-RECEIVING TAPE USED TO PRODUCE PRINT LABELS

(75) Inventors: Motonori Tanaka, Nagoya (JP); Mina Kawai, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 820 days.

(21) Appl. No.: 12/583,918

(22) Filed: Aug. 27, 2009

(65) Prior Publication Data

US 2010/0060919 A1 Mar. 11, 2010

(30) Foreign Application Priority Data

Sep. 10, 2008 (JP) ................. 2008-232315

(51) Int. Cl.
*G06K 15/00* (2006.01)
*G06F 3/12* (2006.01)
*H04N 1/60* (2006.01)
*B42D 15/00* (2006.01)

(52) U.S. Cl.
USPC ......... 358/1.9; 358/1.12; 358/1.14; 358/1.15; 358/1.18; 283/81; 283/101; 283/104

(58) Field of Classification Search
USPC ............... 359/1.9; 358/1.9, 1.15, 1.5, 1.12, 358/1.13, 1.14, 1.18, 462, 448, 453, 537; 358/528; 345/619, 620, 628, 636, 660; 400/1, 400/9, 17, 61, 68, 76, 615.2, 83, 21, 65, 208, 400/621, 703, 512, 587, 609, 614; 283/81, 283/101, 104, 107, 109
See application file for complete search history.

(56) References Cited

U.S. PATENT DOCUMENTS 5,393,147 A * 2/1995 Ueno et al. .................. 400/65
6,088,027 A 7/2000 Konar et al.
(Continued)

FOREIGN PATENT DOCUMENTS

EP 0141411 5/1985
EP 1804173 A1 * 4/2007
(Continued)

OTHER PUBLICATIONS

Chinese Office Action issue in Chinese Application No. 200910170567.2 on Mar. 15, 2013.

*Primary Examiner* — Benny Q Tieu
*Assistant Examiner* — Ngon Nguyen
(74) *Attorney, Agent, or Firm* — McCarter & English, LLP

(57) ABSTRACT

This disclosure discloses a print label editing apparatus comprising: an operation device that enables an operator to edit print contents to be printed on a print-receiving tape; a display device that displays a print image to be printed; a reference position determining portion that determines whether or not a first reference position in a printable area for an object area exists, based on a preset position of said object area, said object area including a print object within said printable area of a printing device for said print-receiving tape; and an object resetting portion that scales and resets said object area by using said first reference position as a standard in a case where it has been determined that said first reference position exists by said reference position determining portion and a scaling operation that enlarges or reduces said print object has been performed by said operation device.

18 Claims, 11 Drawing Sheets

U.S. PATENT DOCUMENTS

| | | | |
|---|---|---|---|
| 6,149,325 A | 11/2000 | Nunokawa et al. | |
| 7,184,167 B1 * | 2/2007 | Ito et al. | 358/1.18 |
| 7,675,528 B2 * | 3/2010 | Walker et al. | 345/620 |
| 2004/0205624 A1 | 10/2004 | Lui et al. | |
| 2005/0007382 A1 * | 1/2005 | Schowtka | 345/619 |
| 2006/0103667 A1 | 5/2006 | Amit et al. | |
| 2007/0024908 A1 | 2/2007 | Hanechak | |
| 2007/0177201 A1 * | 8/2007 | Tanaka et al. | 358/1.15 |
| 2007/0192686 A1 | 8/2007 | Fortes et al. | |
| 2007/0283249 A1 * | 12/2007 | Nose et al. | 715/527 |
| 2008/0074697 A1 * | 3/2008 | Sawada et al. | 358/1.15 |
| 2008/0095470 A1 | 4/2008 | Chao et al. | |
| 2008/0267685 A1 * | 10/2008 | Moriyama et al. | 400/613 |

FOREIGN PATENT DOCUMENTS

| | | |
|---|---|---|
| EP | 1 804 173 | 7/2007 |
| JP | 6-38019 | 2/1994 |
| JP | 2001 278517 | 10/2001 |
| JP | 2003241359 | 8/2003 |

* cited by examiner

PRINT LABEL EDITING APPARATUS ENABLING OPERATOR TO EDIT THE PRINT CONTENTS FOR A PRINT-RECEIVING TAPE USED TO PRODUCE PRINT LABELS

CROSS-REFERENCE TO RELATED APPLICATION

The present application claims priority from Japanese Patent Application No. 2008-232315, which was filed on Sep. 10, 2008, the disclosure of which is incorporated herein by reference in its entirety.

BACKGROUND

1. Field

The present disclosure relates to a print label editing apparatus for enabling an operator to edit the print contents for a print-receiving tape used to produce print labels.

2. Description of the Related Art

Print editing apparatuses that enable an operator to edit print contents when printing advertising literature, a catalog, or the like, have been known. In such a print editing apparatus, an object area that includes a print object comprising text, images, or the like is disposed in a desired location within a printable area, thereby making it possible for the operator to edit the print contents.

One such print editing apparatus is described in JP, A, 2003-241359, for example. In this print editing apparatus, the relative positional relationship of an object area (object) with respect to other objects can be manually set when the object area is subjected to a scaling operation that enlarges or reduces the object size during the editing of the print contents. With this arrangement, when a scaling operation is performed on the object area, the relationship between the object area and the other objects becomes the set positional relationship without any special operation performed by the operator.

A print label that is produced by printing print on a print-receiving tape and cutting the tape at a predetermined length is known. Such a print label is used by affixing the label to a target object. During the production of such a print label as well, a print label editing apparatus can be used to dispose the object area that includes the print object at a desired location within a printable area, making it possible to edit the print contents, similar to the above.

Here, when the print contents are to be edited using the print label editing apparatus and the operator has set the object area within a printable area based on some type of reference (for example, left alignment, right alignment, upper alignment, lower alignment, upper left alignment, lower left alignment, upper right alignment, lower right alignment) and performed a scaling operation on the object area, a shift in the relative positional relationship occurs between the object area and other objects (here, printable area), causing displacement of the above position setting. In such a case, the position of the object area that had shifted after the scaling operation needs to be reset, requiring extra operation work by the operator.

Here, the above-described prior art can conceivably be applied to the print label editing apparatus. In such a case, it is possible for the operator to manually set the relative positional relationship of the object area with respect to the printable area in advance, thereby making it possible to prevent any change in that positional relationship even when a scaling operation is performed on the object area. Nevertheless, in such a case, the operator needs to manually set the relative positional relationship between the object area and the printable area in advance, rendering the reduction in work load insufficient.

SUMMARY

It is therefore an object of the present disclosure to provide a print label editing apparatus capable of reducing the operation work load of the operator and improve user-friendliness.

To achieve the above-described object, an aspect of the present application comprises: an operation device that enables an operator to edit print contents to be printed by a printing device on a print-receiving tape for producing print labels; a display device that displays a print image to be printed by the printing device on the print-receiving tape; a reference position determining portion that determines whether or not a first reference position in a printable area for an object area exists, based on a preset position of the object area, the object area including a print object within the printable area of the printing device for the print-receiving tape; and an object resetting portion that scales and resets the object area by using the first reference position as a standard in a case where it has been determined that the first reference position exists by the reference position determining portion and a scaling operation that enlarges or reduces the print object has been performed by the operation device.

In the aspect of the present disclosure, the operator can edit the print contents for a print-receiving tape using the operation device, and check the print image to be printed by the printing device using the display of the display device when producing a print label. At this time, with the print object already set within the printable area of the print-receiving tape, the operator may perform editing that scales (enlarges or reduces) that print object using the operation device. In such a case in the first aspect of the present disclosure, the reference position determining portion determines whether or not the object area comprises a first reference position for scaling the object area with respect to the printable area, based on the position of the object area that includes the print object within the printable area. Then, in a case where the decision is made that the object area comprises a first reference position, the object resetting portion resets the object area so that the object area is scaled on the basis of the first reference position, in accordance with the scaling operation of the print object performed by the operator using the operation device.

With this arrangement, in a case where the original position setting of the object area in the printable area is analogous to a setting based on some type of reference set by the operator, it is possible to automatically perform scaling in a form that complies with that reference and is in accordance with the intention of the operator. As a result, the operator no longer needs to correct the position of the object area after scaling as in a case where scaling is performed using a reference position that conflicts with the intention of the operator, thereby reducing the operation work load of the operator and improving user friendliness.

DETAILED DESCRIPTION OF THE PREFERRED EMBODIMENTS

The following describes an embodiment of the present disclosure with reference to accompanying drawings.

Figure 1:
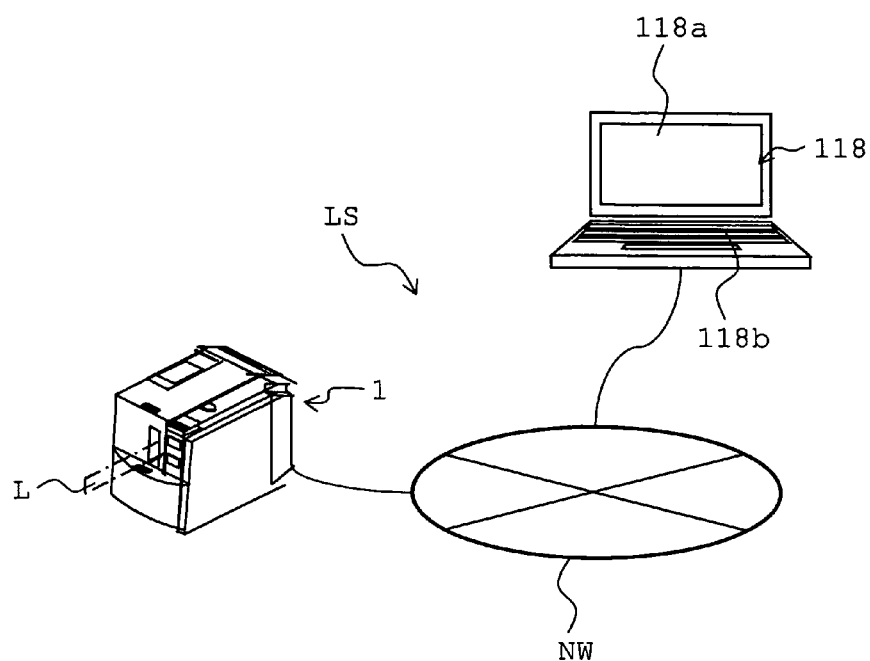
FIG. 1 is a system configuration diagram illustrating a label manufacturing system comprising a print label editing apparatus of the present embodiment.

A system configuration of a label manufacturing system comprising a print label editing apparatus of the present embodiment is described by using FIG. 1.

In FIG. 1, the label manufacturing system LS comprises a label producing apparatus 1 configured to produce a print label L, and a PC 118 that is connected to the label producing apparatus 1 via a wired or wireless communication line NW and capable of editing the print contents of the print label L to be produced by the label producing apparatus 1. The PC 118 comprises an operation part 118b which is a keyboard or mouse used by an operator to edit the print contents to be printed by a print head 23 onto a cover film 103 (refer to FIG. 3 described later) for producing a print label L, and a display part 118a of a liquid crystal display or the like configured to display a print image of the print head 23 for the cover film 103.

Figure 2:
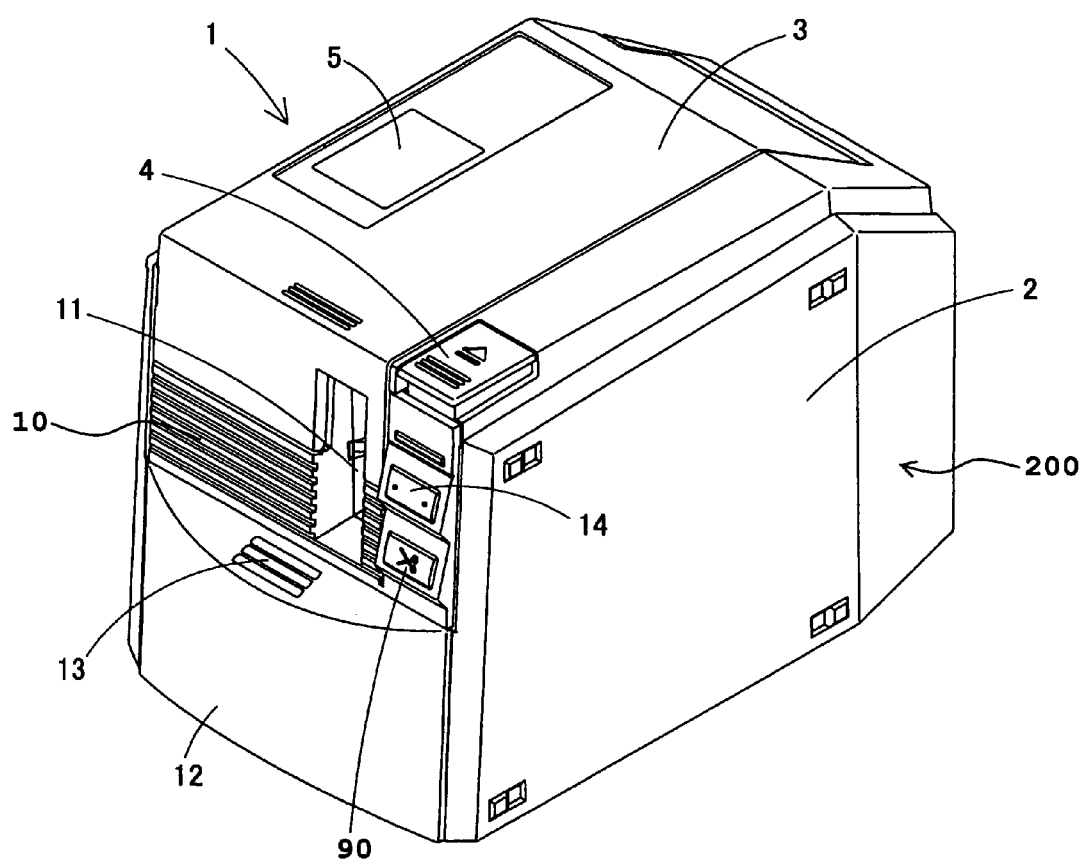
FIG. 2 is a perspective view showing the overall structure of the label producing apparatus.

As shown in FIG. 2, the label producing apparatus 1 produces a print label L using a base tape 101 based on operations from the PC 118. The label producing apparatus 1 comprises an apparatus main body 2 having a housing 200 of a substantially six-sided (substantially cubical) shape, and an opening/closing lid 3 provided on the upper surface of the apparatus main body 2 so as to freely open and close (or detach).

The housing 200 of the apparatus main body 2 comprises a front wall 10, which is positioned at the front of the apparatus (the left front side in FIG. 2) and comprises a label discharging exit 11 configured to discharge the print label T produced within the apparatus main body 2, and a front lid 12 with a rotationally supported bottom edge that is provided below the label discharging exit 11 of the front wall 10.

The front lid 12 comprises a pressing part 13, which is designed to release the front lid 12 forward when pressed from above. Further, on one edge of the front wall 10 is provided a power key 14 that turns the power source of the label producing apparatus 1 on and off. Below this power key 14 is provided a cutter driving key 90 configured to drive a cutting mechanism 15 (refer to FIG. 3 described later) disposed within the apparatus main body 2 based on a manual operation performed by the operator.

The opening/closing lid 3 is rotatably supported by a shaft at the edge of the right rear side in FIG. 2 of the apparatus main body 2, and is always biased in the release direction via a biasing member such as a spring, etc. Then, the opening/closing lid 3 and apparatus main body 2 are unlocked by the pressing of an open/close button 4 disposed adjacent to the opening/closing lid 3 on the upper surface of the apparatus main body 2, and released by the action of the biasing member. Furthermore, in the center side area of the opening/closing lid 3 is provided an inspection window 5 covered by a transparent cover.

Figure 3:
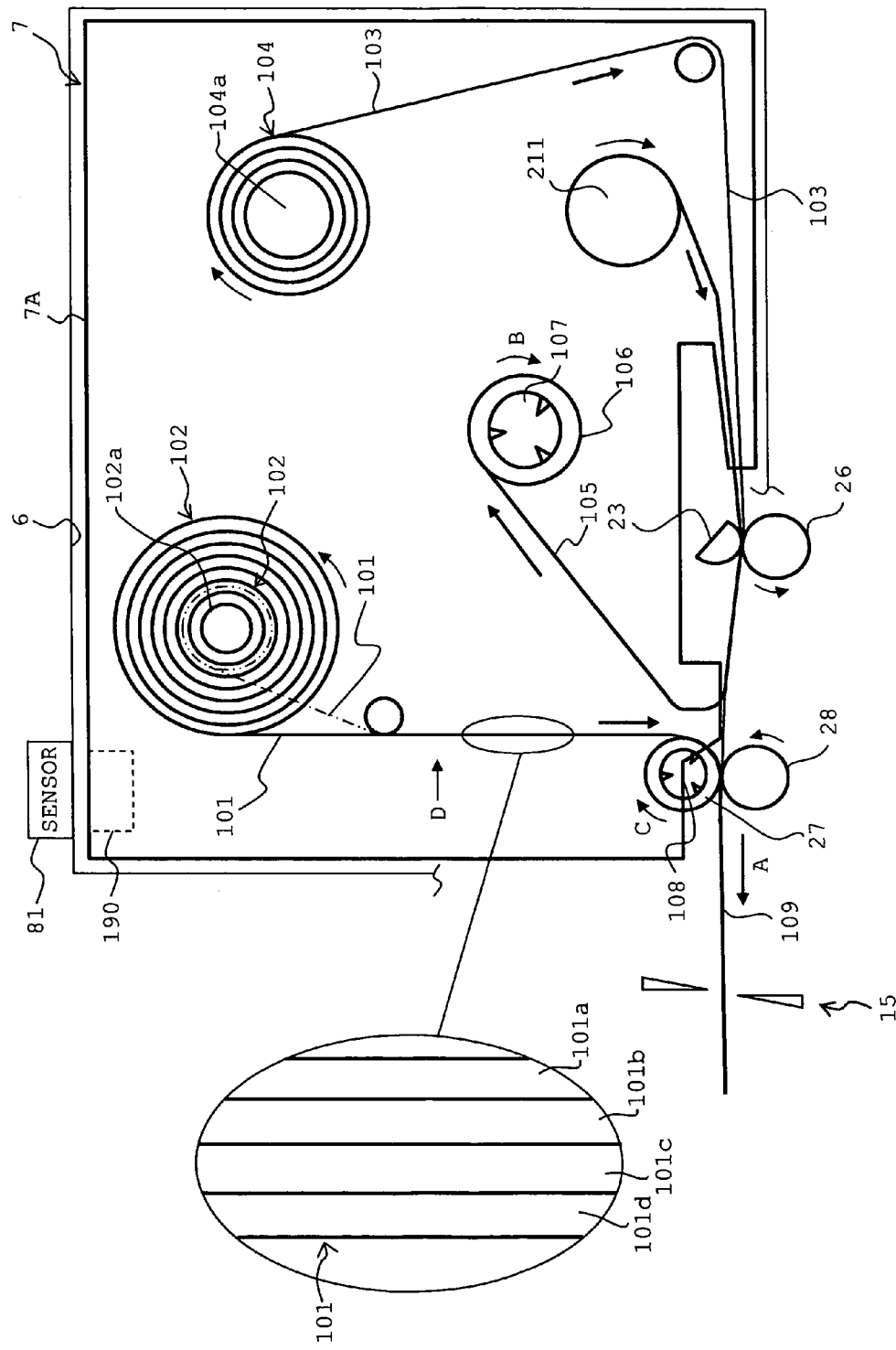
FIG. 3 is an enlarged plan view schematically showing the detailed structure of a cartridge loading section of the label producing apparatus.

As shown in FIG. 3, a cartridge 7 comprises a housing 7A, a first roll 102 (actually spiral in shape, but simply shown in a concentric shape in the figure), around which the strip base tape 101 is wound, and which is disposed within the housing 7A, a second roll 104 (actually spiral in shape, but simply shown in a concentric shape in the figure), around which a transparent cover film 103 is wound, with approximately the same width as that of the base tape 101, a ribbon supply side roll 211 configured to supply an ink ribbon 105 (heat transfer ribbon, which is not required in a case of employing a thermal tape as the print-receiving tape), a ribbon take-up roller 106 configured to rewind the ribbon 105 after the printing, and s feeding roller 27 rotatably supported near a tape discharging part 30 of the cartridge 7.

The feeding roller 27 is configured to affix the base tape 101 and the cover film 103 to each other by applying pressure and transport a label tape 109 with print thus formed in the direction of the arrow A in FIG. 3 (i.e. functioning as a pressure roller as well).

The first roll 102 has the base tape 101 wound around a reel member 102a. In this example, the base tape 101 has a four-layer structure (refer to the partially enlarged view in FIG. 3) comprising an adhesive layer 101a formed of a suitable adhesive material, a colored base film 101b formed of PET (polyethylene terephthalate) or the like, an adhesive layer 101c formed of a suitable adhesive material, and a separation sheet 101d. The four layers of the base tape 101 are layered in that order from the side rolled to the inside (the right side in FIG. 3) to the side corresponding to the opposite side (the left side in FIG. 3).

The adhesive layer 111a is formed on the front side of the base film 101b (on the right side in FIG. 3) for bonding the cover film 103 thereon at a later time. The separation sheet 101d is also bonded to the back side (on the left side of FIG. 3) of the base film 101b by the adhesive layer 101c.

Note that the separation sheet 101d is peeled off when the print label L is affixed as a finished label-shaped product to a predetermined article or the like, thereby affixing the print label L to the article or the like by the adhesive layer 101c.

The second roll 104 has the cover film 103 wound around a reel member 104a. The cover film 103 fed out from the second roll 104 is pressed against the ribbon 105 driven by the ribbon supply side roll 211 and the ribbon take-up roller 106, which are disposed inward from the back side of the cover film 103 (i.e., the side of the cover film 103 which is affixed to the base tape 101), by the print head 23, such that the ribbon 105 is brought into close contact with the back side of the cover film 103.

The ribbon take-up roller 106 and the feeding roller 27 are rotationally driven in coordination by the driving power of a feeding motor 119 (see FIG. 4 described below), which is a pulse motor, for example, provided on the outside of each cartridge 7, that is transmitted to a ribbon take-up roller driving shaft 107 and a tape feeding roller driving shaft 108 via a gear mechanism. The print head 23 is disposed upstream in the feeding direction of the cover film 103 from the feeding roller 27.

The housing 7A of the cartridge 7 comprises a detected part 190 (an identifier of a bumpy shape, for example), and a cartridge sensor 81 is provided at the location corresponding to the detected part 190 of a cartridge holder 6. The cartridge sensor 81 detects cartridge information related to the type of the cartridge 7, and the detected signal of this cartridge sensor 81 is inputted to a control circuit 110 (refer to FIG. 4 described later) so that the control circuit 110 can acquire the cartridge information. The cartridge information includes information such as the tape width of the base tape 101 (cover film 103) of the cartridge 7.

The detection sensor 81 used is, for example, a sensor that performs mechanical detection such as a mechanical switch, a sensor that performs optical detection, or a sensor that performs magnetic detection. Note that a cartridge RFID circuit element may be provided in the housing 7A of the cartridge 7, and the RFID tag information may be read via wireless communication using a detection sensor comprising a reader function.

In the configuration described above, the base tape 101 fed out from the first roll 102 is supplied to the feeding roller 27. The cover film 103 fed out from the second roll 104, in turn, is pressed against the ink ribbon 105 driven by the ribbon supply side roll 211 and the ribbon take-up roller 106, which are disposed inward from the back side of the cover film 103 (i.e., the side of the cover film 103 which is affixed to the base tape 101), by the print head 23, such that the ink ribbon 105 is brought into close contact with the back side of the cover film 103.

Then, when the cartridge 7 is loaded to the cartridge holder 6, the cover film 103 and the ink ribbon 105 are sandwiched between the print head 23 and a platen roller 26, while the base tape 101 and the cover film 103 are sandwiched between the feeding roller 27 and a pressure roller 28. Subsequently, the ribbon take-up roller 106 and the feeding roller 27 are synchronously rotationally driven along the directions denoted by the arrow B and the arrow C, respectively, in FIG. 3 by the driving force provided from the feeding motor 119. Furthermore, the tape feeding roller driving shaft 108, the pressure roller 28, and the platen roller 26 are connected to one another by a gear mechanism (not shown). With such an arrangement, upon driving the tape feeding roller driving shaft 108, the feeding roller 27, the pressure roller 28, and the platen roller 26 rotate, thereby feeding out the base tape 101 from the first roll 102 to the feeding roller 27 as described above. On the other hand, the cover film 103 is fed out from the second roll 104, and a plurality of heating elements of the print head 23 are powered by a print-head driving circuit 120 (see FIG. 4 described below). As a result, the printing corresponding to the back side of the cover film 103 is performed. Then, the base tape 101 and the printed cover film 103 are affixed to each other by the feeding roller 27 and the pressure roller 28 so as to form a single tape, thereby forming the label tape 109 with print, which is then fed to outside the cartridge 7. Subsequently, the ribbon take-up roller driving shaft 107 is driven to take up the ink ribbon 105, which has been used to print the print on the cover film 103, onto the ribbon take-up roller 106.

Then, the label tape 109 with print is cut by the cutting mechanism 15 either automatically or by the cutter driving key 90 (refer to FIG. 2) so as to produce the print label L. This print label L is discharged from the label discharging exit 11.

Figure 4:
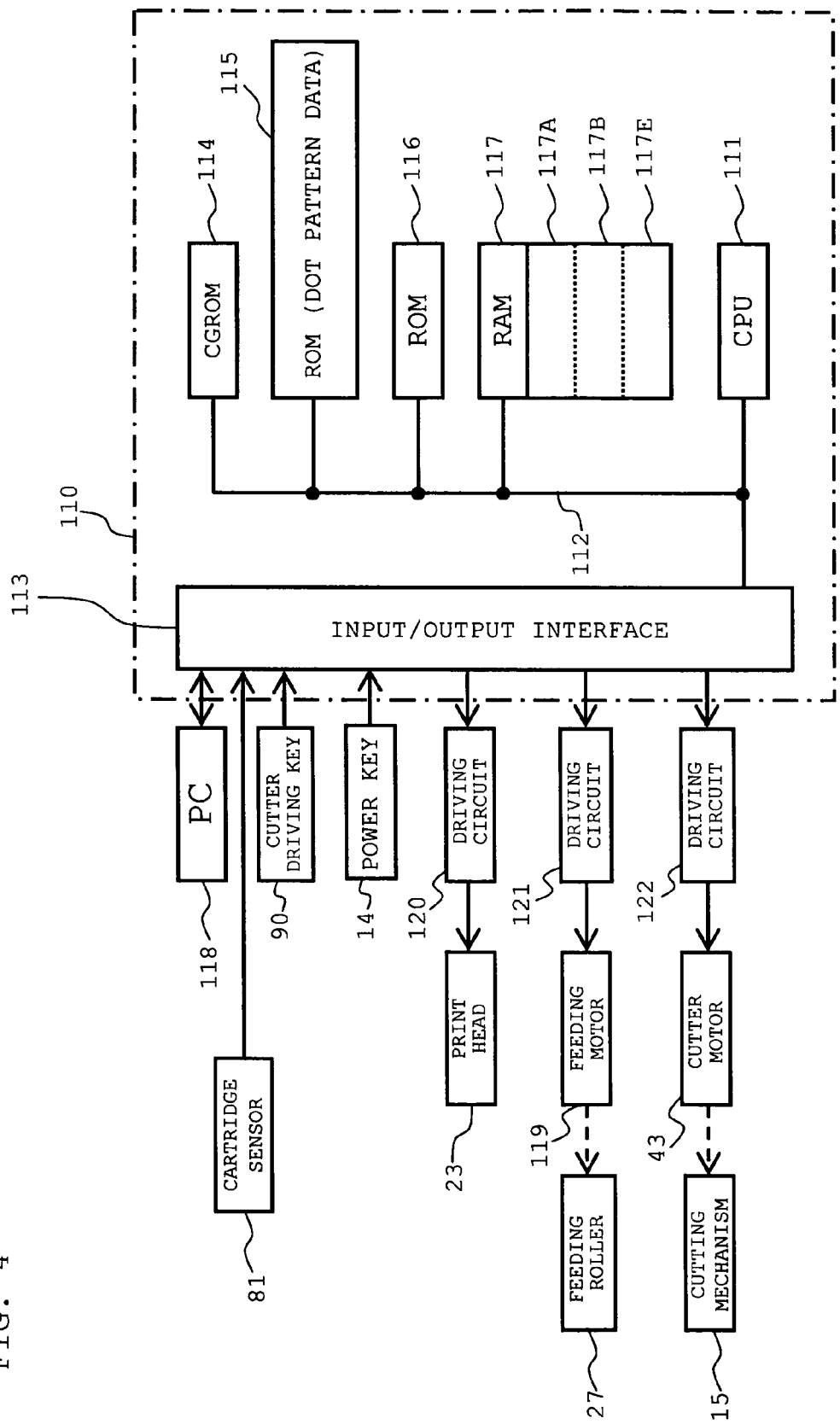
FIG. 4 is a functional block diagram which shows the control system of the label producing apparatus of the embodiment.

The control system of the label producing apparatus 1 is described by using FIG. 4.

In FIG. 4, the control circuit 110 is disposed on a control board (not shown) of the label producing apparatus 1.

On the control circuit 110 are provided a CPU 111 configured to control each device, an input/output interface 113 connected to the CPU 111 via a data bus 112, a CG ROM 114, ROMs 115 and 116, and a RAM 117.

The ROM 116 stores a print drive control program configured to read the data of the print buffer in accordance with the operation input signal from the PC 118 and drive the print head 23 and the feeding motor 119, a cut drive control program configured to drive the feeding motor 119 so as to transport the label tape 109 with print to a cutting position when printing has ended and drive a cutter motor 43 so as to cut the label tape 109 with print by the cutting mechanism 15, a tape discharge program configured to transport and forcibly discharge the cut label tape 109 with print (=print label L) from the discharge exit 11, and various other programs required for controlling the label producing apparatus 1. The CPU 111 performs various operations based on each such programs stored in the ROM 116.

The RAM 117 is provided with a text memory 117A, a print buffer 117B, a parameter storage area 117E, and the like. The text memory 117A stores document data inputted from the PC 118. The print buffer 117B stores dot patterns for printing a plurality of characters, symbols, and the like, as dot pattern data, and the print head 23 prints the dots in accordance with the dot pattern data stored in this print buffer 117B. The parameter storage area 117E stores the various operation data and the like.

The input/output interface 113 is connected to the PC 118, the print driving circuit 120 for driving the print head 23, a feeding motor driving circuit 121 for driving the feeding motor 118, a cutter motor driving circuit 122 for driving the cutter motor 43, the cutter driving key 90, and the cartridge sensor 81.

In such a control system with the control circuit 110 at its core, when character data and the like are inputted via the PC 118, the text (text data) is successively stored in the text memory 117A, the print head 23 is driven via the driving circuit 120 and each heating element is selectively exothermically driven according to the print dots of one line so as to print the dot pattern data stored in the print buffer 117B, while the feeding motor 119 synchronously controls the feeding of the tape via the driving circuit 121.

The greatest feature of the present embodiment of the label manufacturing system LS comprising the basic configuration described above is that, when the print contents are edited using the PC 118 when producing the print label L and the position setting of an original object area So (refer to FIG. 5 described later) of a printable area Sp (refer to FIG. 5 described later) is analogous to a setting that is based on some type of reference set by the operator (such as, a left alignment reference, right alignment reference, upper alignment reference, lower alignment reference, upper left alignment reference, lower left alignment reference, upper right alignment reference, lower right alignment reference, etc.), it is possible to automatically scale the object area So in a form that complies with that reference and is in accordance with the intention of the operator. A detailed description follows.

As shown in FIG. 5, the object area So including the text "Sample" as a print object is disposed within the printable area Sp of the print head 23 for the cover film 103. Here, a case where text is printed is illustrated as an example, but an image such as a photograph or picture, for example, or a graphic such as a barcode may be used as the print object.

At this time, problems such as the following occur. That is, with the print object area So set within the printable area Sp of the cover film 103, the operator sometimes performs editing that scales (enlarges or reduces) that print object area So using the operation part 118b. Normally, a reference position for the object area So with respect to the printable area Sp is preset. Then, when the scaling operation is performed, resetting in association with the scaling of the object area So is performed on the basis of this reference position.

Figure 5A:
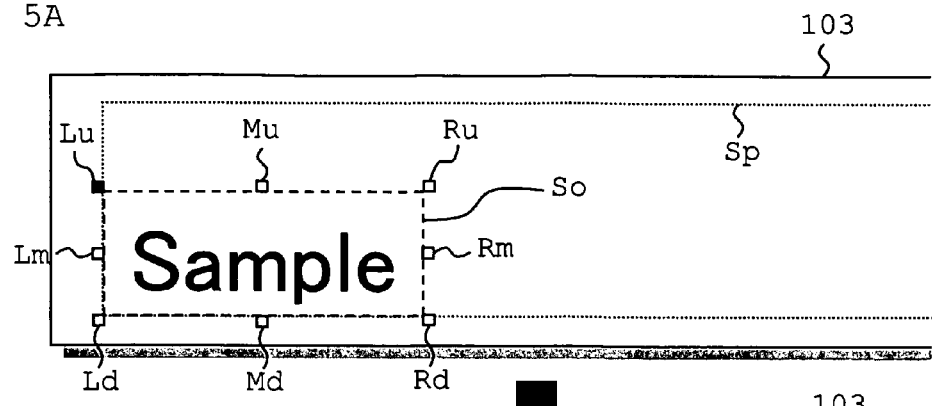
FIG. 5 is a diagram illustrating an example of a display of the display part of the PC in a case where the setting does not correspond to the position setting reference set by the operator.
Figure 5B:
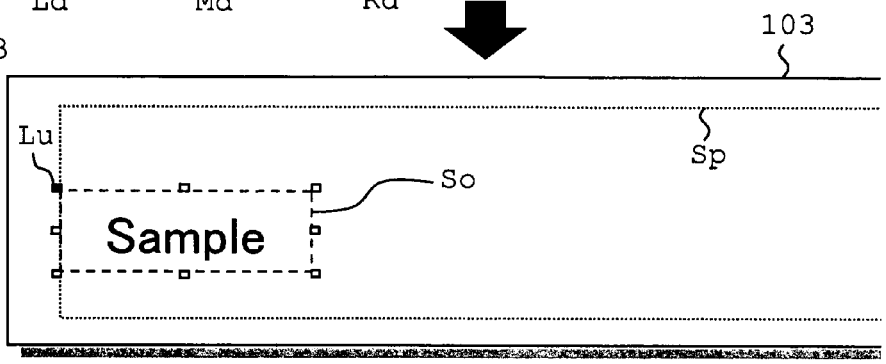

In the example shown in FIG. 5, among the reference points (upper left Lu, middle left Lm, lower left Ld, upper middle Mu, lower middle Md, upper right Ru, middle right Rm, and lower right Rd) comprising the outer edge of the object area So, the reference position is set to the upper left reference point Lu (indicated by a black square in the figure). Thus, as shown in FIG. 5A, when the operator arranges the object area So at the lower left of the printable area Sp and the print object area So is scaled (reduced in this example), the resetting in association with the scaling of the object area So is performed on the basis of the upper left reference point Lu. As a result, the arrangement of the object area So with respect to the printable area Sp shifts as shown in FIG. 5B, rendering scaling in the form intended by the operator, i.e., arrangement of the object at the lower left, not possible. As a result, the operator needs to correct the position of the object area So after scaling, which increases the operation work load of the operator.

Figure 6A:
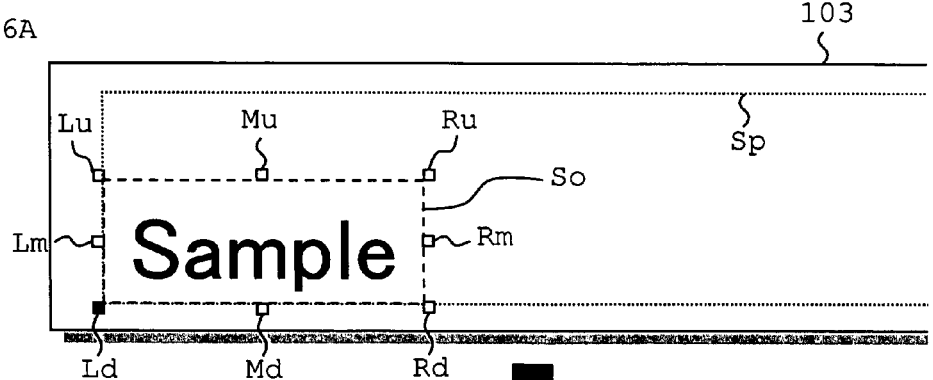
FIG. 6 is a diagram illustrating an example of a display of the display part of the PC of the embodiment in a case where the setting corresponds to the position setting reference set by the operator.
Figure 6B:
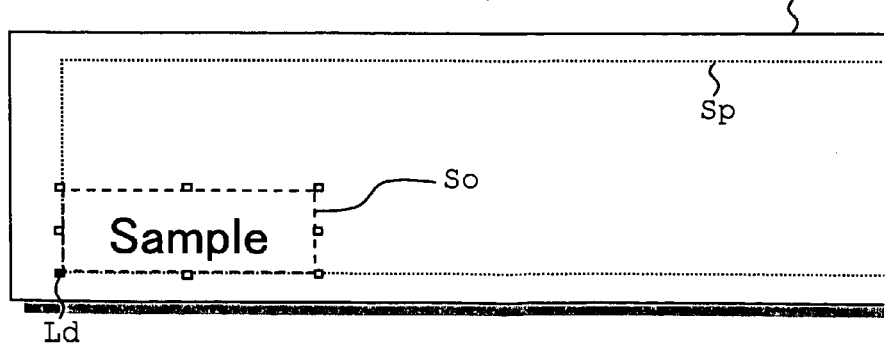

In response, in the present embodiment as shown in FIG. 6A, when the operator arranges the object area So at the lower left of the printable area Sp, the reference position is automatically set to the lower left reference point Ld (indicated by a black square in the figure) of the object area So. As a result, as shown in FIG. 6B, the resetting that is association with the scaling of the object area So is performed on the basis of the lower left reference point Ld, thereby scaling (reducing in this example) the object area So while maintaining the arrangement of the object area So at the lower left with respect to the printable area Sp. In this manner, scaling in the form intended by the operator, i.e., with the object arranged at the lower left, is automatically executed, thereby eliminating the need for the operator to correct the position of the object area So after scaling and, in turn, reducing operation work load. A detailed description of the above follows.

Figure 7:
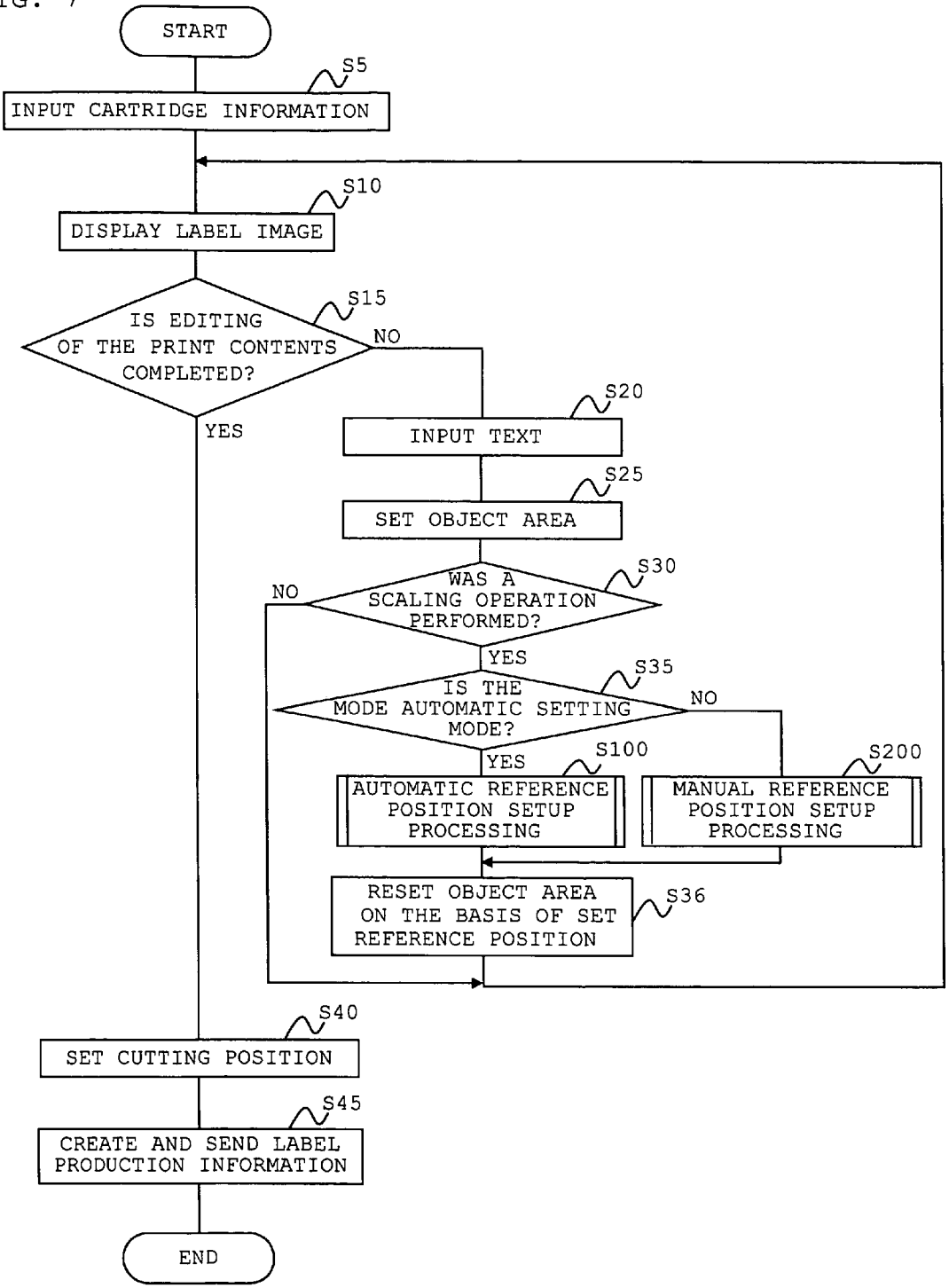
FIG. 7 is a flowchart illustrating the control content executed by the control circuit of the PC when a print label is produced.

The control content executed by a control circuit 130 (not shown) of the PC 118 is described by using FIG. 7. The control content is executed by the above control circuit 130 base on a predetermined control program. The control program may be included in a basic OS of PC 118 in advance, and also may be individually started on the OS as well as other applications. Further, for example, the control program recorded in a suitable recording medium such as a disc and a memory, which may be read by a computer, is installed in a memory of PC 118 which is not shown or a mass storage device which is not shown, and subsequently the control circuit 130 of the PC 118 starts the program after reading it. At the time, as described above, the control program recorded in the recording medium capable of being read by a computer, may be downloaded from the web, and also may be installed in the memory of PC 118 or the mass storage device. The control circuit 130 starts this flow when, for example, the operator enters a suitable operation that instructs the system to start label editing.

First, in step S5, cartridge information detected by the cartridge sensor 81 of the label producing apparatus 1 and acquired by the control circuit 110 is inputted via the communication line NW. The cartridge information includes information such as the tape width of the base tape 101 (cover film 103) of the loaded cartridge 7, as described above.

In step S10, the control circuit 130 outputs a display signal to the display part 118a and, based on the acquired cartridge information (tape width), displays an image of the print label L (refer to FIG. 10, etc., described later). This display includes the outer edge of the print label L, the printable area Sp which is the printable area of the cover film 103 by the print head 23, and the object area So which includes the print object, such as text, an image, a barcode, or the like. At this time, the size of the printable area Sp is set in advance in accordance with the tape width, and the printable area Sp is displayed at that set size. Or, an initial value of the size of the object area So is set, and the object area So is displayed at that initially set size. The following describes a case where the print object is text as an example.

In step S15, the control circuit 130 determines whether or not editing of the print contents by the operator has been completed, according to whether or not an operation signal of a label production start instruction has been inputted from the operation part 118b, for example. In a case where editing has not been completed, the decision is made that the condition is not satisfied, and the flow proceeds to step S20.

In step S20, the control circuit 130 inputs the text information entered via the operation part 118b by the operator.

In step S25, the control circuit 130 defines the object area So in accordance with the text information inputted in the step S20. That is, the object area So is relatively increased (lengthened, for example) in a case where there is a large amount of text inputted by the operator, and relatively decreased in a case where there is a small amount of text inputted by the operator.

In step S30, the control circuit 130 determines whether or not the operator has performed a scaling operation for enlarging or reducing the text, which is the print object, based on the input signal from the operation part 118b. The scaling operation includes operations that enlarge and reduce text (including the object area So) vertically or horizontally, or operations that change the text font (font, style, size, etc.), performed using the operation part 118b. Furthermore, when the print object is not text but rather an image such as a photograph or picture or a graphic such as a barcode as described above, the scaling operation includes operations that enlarge and reduce the image or graphic in the vertical and horizontal directions.

In a case where such a scaling operation has not been performed, the decision is made that the condition is not satisfied, and the flow proceeds directly to the earlier step S10. On the other hand, if a scaling operation was performed, the decision is made that the condition is satisfied, and the flow proceeds to step S35.

In step S35, the control circuit 130 determines whether the mode is automatic setting mode in which the reference position of the object area So is automatically set and the object area So is scaled and reset on the basis of the automatically set reference position, or manual setting mode in which the object area So is scaled and reset on the basis of a reference position set by a manual operation via the operation part 118b. The mode to be used to produce the labels is set in advance by the operator. In a case where automatic setting mode is selected, the decision is made that the condition is satisfied, and the flow proceeds to step S100.

In step S100, the control circuit 130 executes automatic reference position setup processing for automatically setting a reference position for scaling the object area So based on the position of the object area So within the printable area Sp (refer to FIG. 8 described later). Then, the flow proceeds to step S36 described later.

On the other hand, in a case where manual setting mode is selected in the step S35, the condition is not satisfied and the flow proceeds to step S200 where the control circuit 130 executes manual reference position setup processing for manually setting the reference position for scaling the object area So (refer to FIG. 9 described later). Subsequently, the flow proceeds to step S36.

In step S36, the control circuit 130 scales and resets the object area So on the basis of the reference position set in the step S100 or the step S200. Then, the flow returns to the earlier step S10.

When the editing of the print contents is completed by repeating the step S10 to step S35, step S100 or step S200, and step S36, the decision is made that the condition is satisfied in step S15 and the flow proceeds to the next step S40.

In step S40, the control circuit 130 sets the cutting position based on the object area So set in the step S100 or the step S200. The cutting position is for cutting the base tape 101 by the aforementioned cutting mechanism 15 so as to manufacture a print label L, and is set to a position that adds a predetermined margin length to the rear end position of the object area So set by the step S100 or the step S200. Subsequently, the flow proceeds to the next step S45.

In step S45, the control circuit 130 creates setting information such as the cutting position set in the above step, and label production information including the print data edited by the operator. The created label production information is then sent to the control circuit 110 of the label producing apparatus 1 via the communication line NW. With the above, the flow ends.

While the above has been described in connection with an illustrative scenario in which a cutting position is set based on the object area So, i.e., the label length of the print label L is variable according to the position of the object area So and the size of the text inputted, the present disclosure is not limited thereto and the label length may be a fixed length. In such a case, the label length may be set in advance (or a plurality of label lengths set in advance are prepared so that the operator may select a length therefrom), and the cutting position may be set in accordance with the fixed length, regardless of the object area So, in the step S40.

Figure 8:
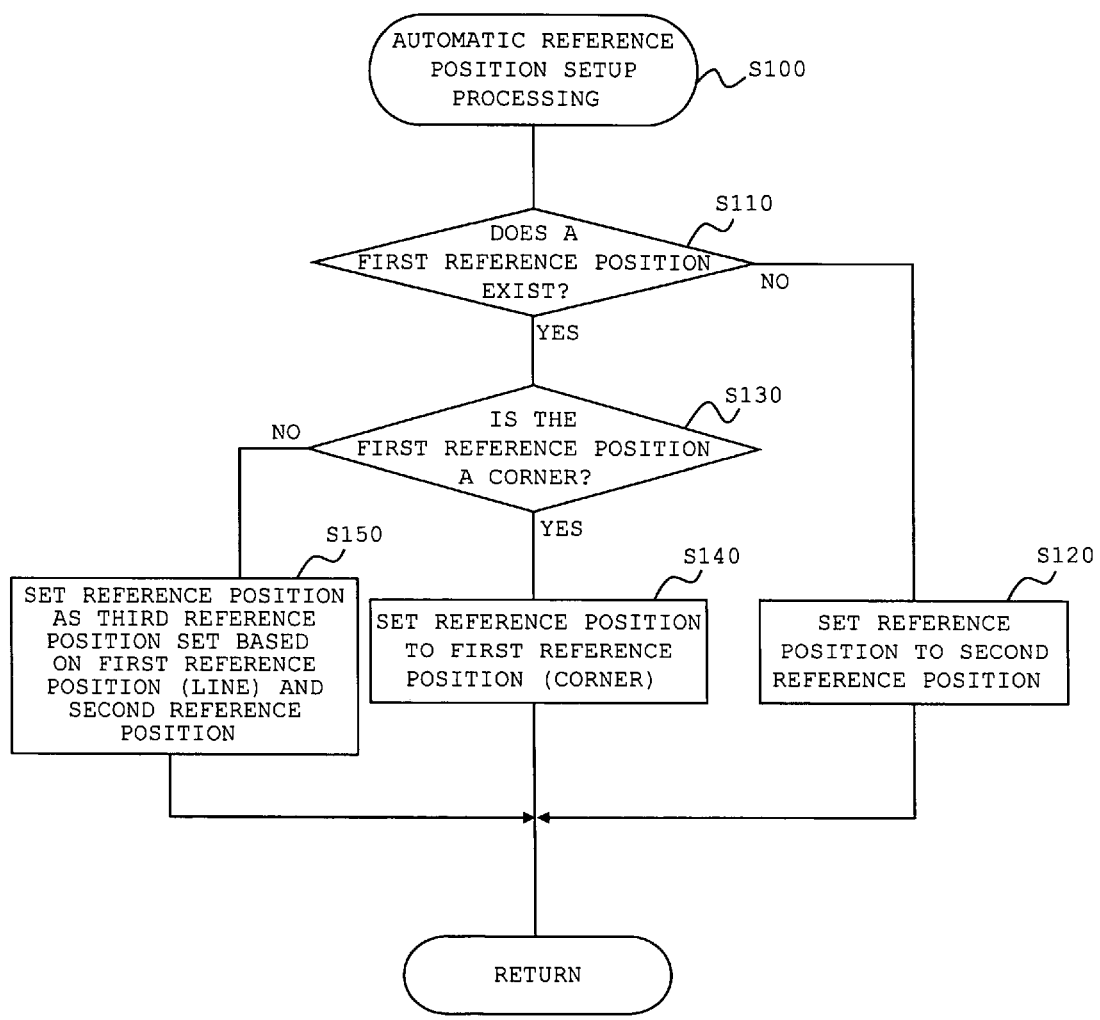
FIG. 8 is a flowchart illustrating the detailed contents of the automatic reference position setup processing of step S100.

The detailed content of the automatic reference position setup processing of the step S100 is described by using FIG. 8.

In step S110, the control circuit 130 determines whether or not a first reference position for the printable area Sp of the object area So exists based on the position of the object area So that includes the print object set in advance within the printable area Sp of the print head 23 for the cover film 103. Here, the first reference position is automatically defined as a corner of the object area So in a case where the position of a corner (any corner; equivalent to reference points Lu, Ld, Ru, and Rd shown in FIG. 5 previously described) of the object So matches the position of a specific corner (the upper left or lower left corner in a case where the label length is variable, or any corner in a case where the label length is the fixed length previously described) of the printable area Sp. A "match" in this case is not limited to a complete match of the position of a corner of the object area So and the position of a corner of the printable area Sp, but includes cases where the distance between the position of a corner of the object area So and the position of a corner of the printable area Sp is within a predetermined first threshold value (set to a suitable value in advance).

Or the first reference position is automatically defined as a line of the object area So in a case where a line (any side) comprising the outer edge of the object area So matches a specific line (the left side, the upper side or the lower side in a case where the label length is variable, or any of the four sides in a case where the label length is the fixed length described above) comprising the outer edge of the printable area Sp. A "match" in this case is not limited to a complete match of the position of a line comprising an outer edge of the object area So and the position of a line comprising the outer edge of the printable area Sp, but includes cases where the distance between the position of a line comprising an outer edge of the object area So and the position of a line comprising an outer edge of the printable area Sp is within a predetermined second threshold value (set to a suitable value in advance).

In a case where a first reference position does not exist, i.e., a case where a corner of the object area So does not match a corner of the printable area Sp and a line comprising an outer edge of the object area So does not match a line comprising an outer edge of the printable area Sp, the decision is made that the condition is not satisfied and the flow proceeds to step S120.

In step S120, the control circuit 130 sets the reference position that will serve as the basis when the object area So is scaled as a second reference position. Here, the second reference position is a reference position manually set via the operation part 118b by the operator, separately from the decision of the first reference position. The second reference position may be set to an aforementioned reference point (upper left Lu, middle left Lm, lower left Ld, upper middle Md, lower middle Md, upper right Ru, middle right Rm, and lower right Rd) shown in FIG. 5 described earlier. In a case where the operator has not manually set a second reference position, the upper left corner of the object area So (equivalent to the reference point Lu shown in FIG. 5) is set as the initial setting of the second reference position. Then, the routine ends.

On the other hand, in a case where a first reference position exists in the step S110, i.e., a case where a corner of the object area So matches a corner of the printable area Sp or a line comprising an outer edge of the object area So matches a line comprising an outer edge of the printable area Sp, the decision is made that the condition is satisfied and the flow proceeds to step S130.

In step S130, the control circuit 130 determines whether or not the first reference position is a corner of the object area So (in other words, whether or not a corner of the object area So matches a corner of the printable area Sp). In a case where the first reference position is a corner of the object area So, the condition is satisfied and the flow proceeds to step S140.

In step S140, the control circuit 130 sets the reference position to serve as the basis when the object area So is scaled to the corner of the object area So that is the first reference position, regardless of the setting of the second reference position. Then, the routine ends.

On the other hand, in a case where the first reference position is not a corner of the object area So in the step S130 (that is, in a case where the first reference position is a line comprising an outer edge of the object area So), the condition is not satisfied and the flow proceeds to step S150.

In step S150, the control circuit 130 sets the reference position that is to serve as the basis when the object area So is scaled as a third reference position. Here, the third reference position is a reference position set based on both the first reference position and the second reference position when the first reference position is a line comprising an outer edge of the object area So. Specifically, for example, in a case where the first reference position is a line comprising the left side of the object area So and the second reference position is set to the lower right corner (equivalent to the reference point Rd shown in FIG. 5) by the operator, the third reference position is set to the lower left corner (equivalent to the reference point Ld shown in FIG. 5), which is the reference point on the lower side of the left side of the object area So (refer to FIG. 12 described later). Or, for example, in a case where the first reference position is a line comprising the upper side of the object area So and the second reference position is similarly set to the lower right corner (equivalent to the reference point Rd shown in FIG. 5) by the operator, the third reference position is set to the upper right corner (equivalent to the reference point Ru shown in FIG. 5), which is the reference point on the right side of the upper side of the object area So (refer to FIG. 13 described later). Then, the routine ends.

Figure 9:
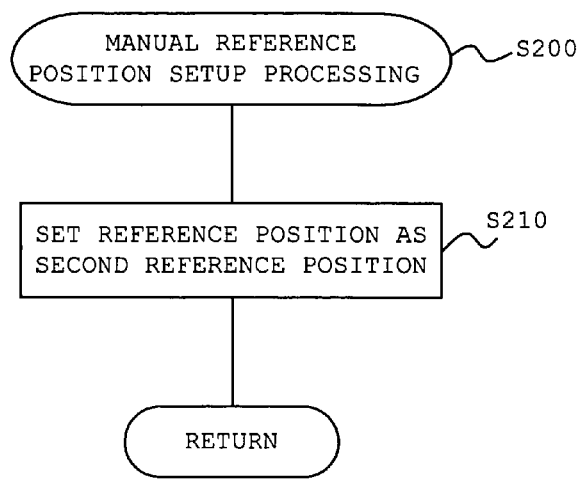
FIG. 9 is a flowchart illustrating the detailed contents of the manual reference position setup processing of step S200.

The detailed content of the manual reference position setup processing of the step S200 is described by using FIG. 9.

In step S210, the control circuit 130, similar to the step S120, sets the reference position that is to serve as the basis when the object area So is scaled to the second reference position manually set by the operator. Here, unlike the aforementioned automatic reference position setup processing, the reference position is always set to the manually set second reference position, regardless of whether or not a corner of the object area So matches a corner of the printable area Sp, or whether or not a line comprising an outer edge of the object area So matches a line comprising an outer edge of the printable area Sp. Then, the routine ends.

Subsequently, FIG. 10 to FIG. 14 respectively illustrate examples of displays of the display part 118a of the PC 118 when the operator scales the object area So, which is performed by a control process such as that described above. These FIGS. 10 to 14 are display examples in the case of automatic setting mode in which the reference position of the object area So is automatically set.

Figure 10A:
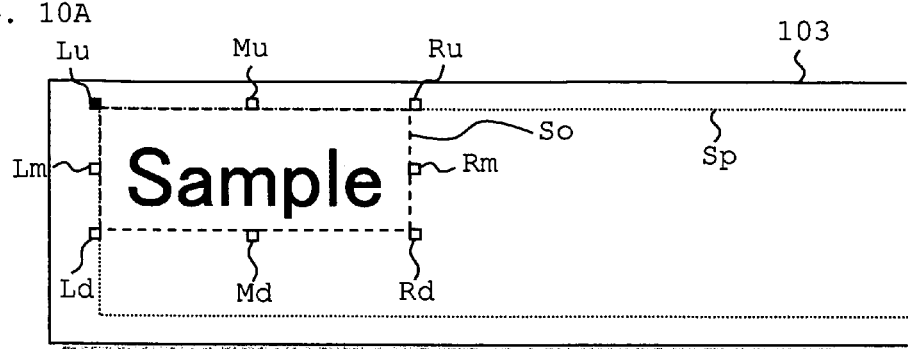
FIG. 10 is a diagram illustrating an example of the display of the display part of the PC when a scaling operation is performed in a case where the operator has arranged the object area at the upper left of the printable area.
Figure 10B:
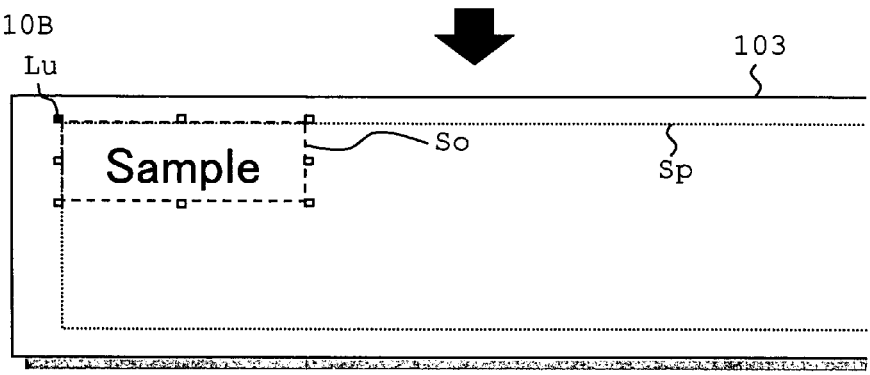

A display example of a case where the operator arranged the object area So at the upper left of the printable area Sp is described by using FIG. 10. As shown in FIG. 10A, because the position of the upper left corner (equivalent to the reference point Lu in the figure) of the object area So matches the position of the upper left corner of the printable area Sp, the upper left corner of the object area So is defined as the first reference position (indicated by the black square in the figure; this square may appear white in the actual display or may be changed to a different color after the reference position is defined as shown in the figure; hereinafter the same). Thus, the condition is satisfied in steps S110 and S130 in FIG. 8, and the reference position is automatically set to the upper left corner of the object area So, which is the first reference position, in step S140. As a result, when the resetting associated with the scaling (reduction in this example) of the object area So is performed on the basis of the upper left reference point Lu (refer to step S36 in FIG. 7), as shown in FIG. 10B, the object area So is scaled (reduced in this example) while maintaining the arrangement of the object area So at the upper left with respect to the printable area Sp.

Figure 11A:
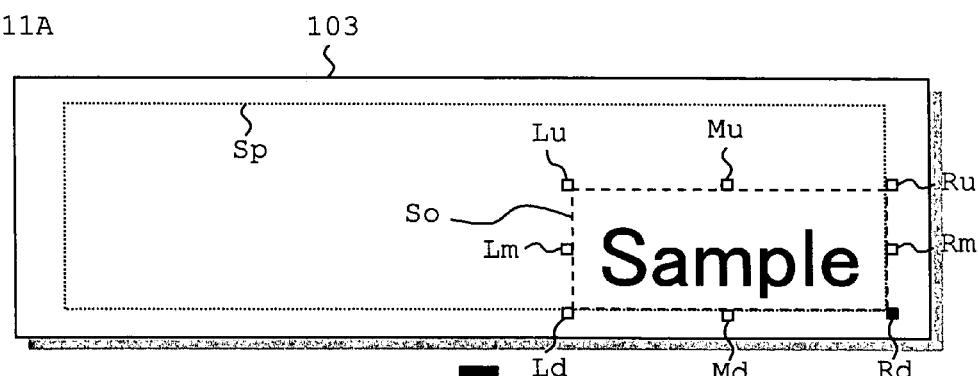
FIG. 11 is a diagram illustrating an example of the display of the display part of the PC when a scaling operation is performed in a case where the operator has arranged the object area at the lower right of the printable area.
Figure 11B:
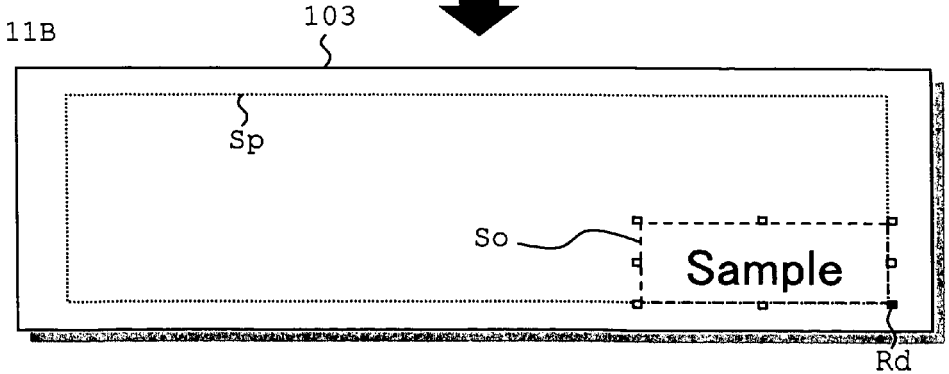

A display example of a case where the label length is the aforementioned fixed length is described by using FIG. 11. As shown in FIG. 11, the entire print label L including the right end thereof is displayed on the display part 118a of the PC 118. In this example, the operator has arranged the object area So at the lower right of the printable area Sp. As shown in FIG. 11A, because the position of the lower right corner (equivalent to the reference point Rd in the figure) of the object area So matches the position of the lower right corner of the printable area Sp, the lower right corner of the object area So is defined as the first reference position (indicated by the black square in the figure). Thus, the condition is satisfied in steps S110 and S130 in FIG. 8, and the reference position is automatically set to the lower right corner of the object area So, which is the first reference position, in step S140. As a result, when the resetting associated with the scaling (reduction in this example) of the object area So is performed on the basis of the lower right reference point Rd, as shown in FIG. 11B, the object area So is scaled (reduced in this example) while maintaining the arrangement of the object area So at the lower right with respect to the printable area Sp.

Figure 12A:
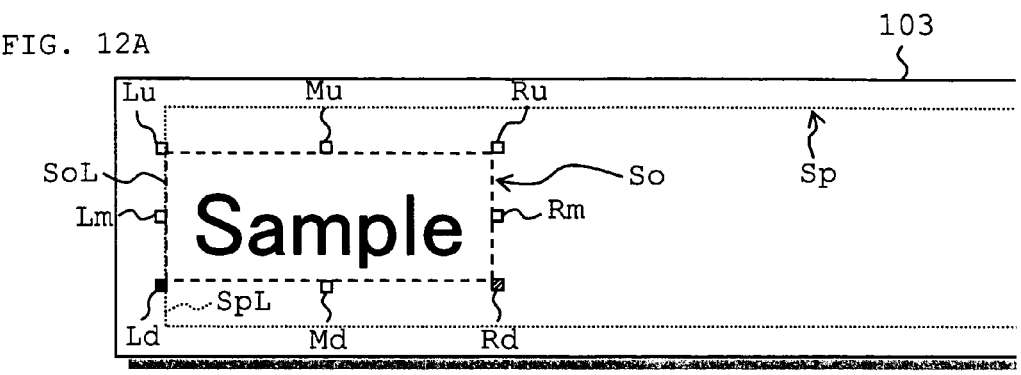
FIG. 12 is a diagram illustrating an example of the display of the display part of the PC when a scaling operation is performed in a case where the operator has arranged the object area so that it is aligned to the left with respect to the printable area.
Figure 12B:
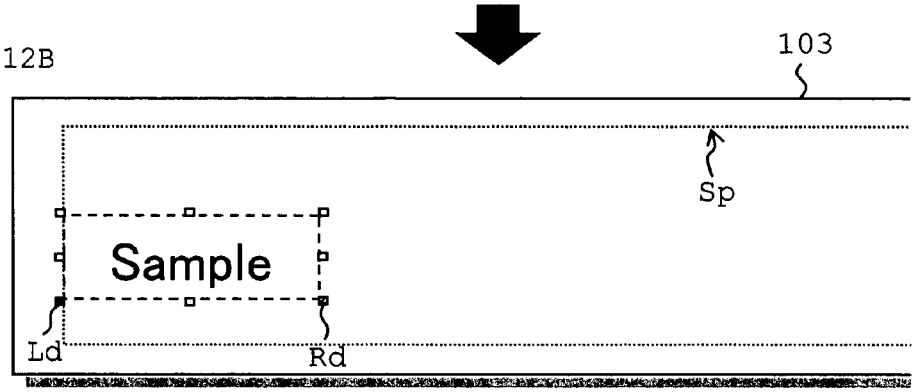

A display example of a case where the operator arranged the object area So so that it is aligned to the left with respect to the printable area Sp is described by using FIG. 12. As shown in FIG. 12A, because a line SoL comprising the left side of the outer edge of the object area So matches a line SpL comprising the left side of the outer edge of the printable area Sp, the line SoL comprising the left side of the object area So is defined as the first reference position. Thus, the condition is satisfied in step S110 of FIG. 8 but not satisfied in step S130, and the flow proceeds to step S150. At this time, in this example, the lower right corner (equivalent to the reference point Rd in the figure) is set as the second reference position as a result of a manual operation performed by the operator (indicated by a square shaded with diagonal lines in the figure). Thus, in step S150, the lower left corner (equivalent to the reference point Ld in the figure), which is the reference point on the lower side of the line SoL, which is the left side of the object area So, is defined as the third reference position (indicated by a black square in the figure), and the reference position is automatically set to the lower left corner of the object area So, which is the third reference position. As a result, when the resetting in association with the scaling (reduction in this example) of the object area So is performed on the basis of the lower left reference point Ld (refer to step S36 in FIG. 7), as shown in FIG. 12B, the object area So is scaled (reduced in this example) while maintaining the left alignment of the object area So with respect to the printable area Sp.

Figure 13A:
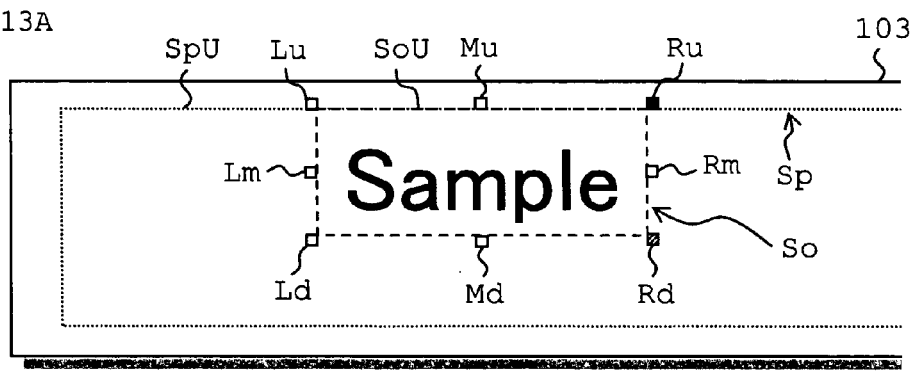
FIG. 13 is a diagram illustrating an example of the display of the display part of the PC when a scaling operation is performed in a case where the operator has arranged the object area so that it is aligned to the top with respect to the printable area.
Figure 13B:
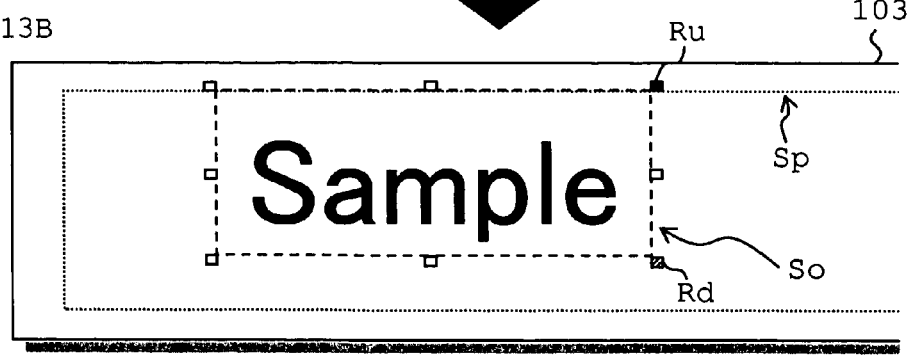

A display example of a case where the operator arranged the object area So so that it is aligned to the top with respect to the printable area Sp is described by using FIG. 13. As shown in FIG. 13A, because a line SoU comprising the upper side of the outer edge of the object area So matches a line SpU comprising the upper side of the outer edge of the printable area Sp, the line SoU comprising the upper side of the object area So is defined as the first reference position. Thus, the condition is satisfied in step S10 of FIG. 8 but not satisfied in step S130, and the flow proceeds to step S150. At this time, in this example, the lower right corner (equivalent to the reference point Rd in the figure) is set as the second reference position as a result of a manual operation performed by the operator (indicated by a square shaded with diagonal lines in the figure), similar to the above. Thus, in step S150, the upper right corner (equivalent to the reference point Ru in the figure), which is the reference point on the right side of the line SoU, which is the upper side of the object area So, is defined as the third reference position (indicated by a black square in the figure), and the reference position is automatically set to the upper right corner of the object area So, which is the third reference position. As a result, when the resetting in association with the scaling (enlargement in this example) of the object area So is performed on the basis of the upper right reference point Ru (refer to step S36 in FIG. 7), as shown in FIG. 13B, the object area So is scaled (enlarged in this example) while maintaining the upper alignment of the object area So with respect to the printable area Sp.

Figure 14A:
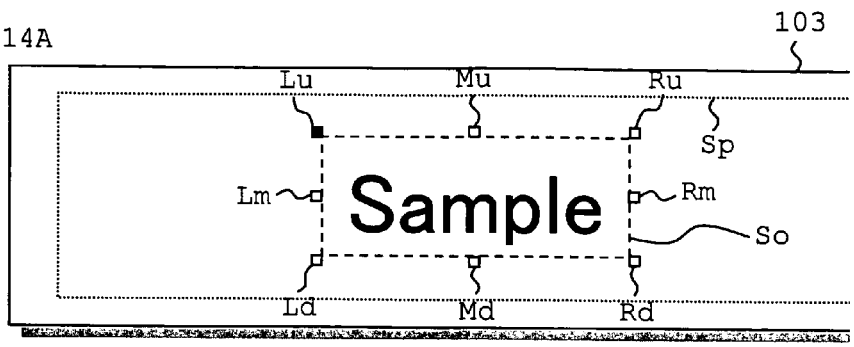
FIG. 14 is a diagram illustrating an example of the display of the display part of the PC when a scaling operation is performed in a case where the operator neither arranged the object area on a corner or a line of the printable area.
Figure 14B:
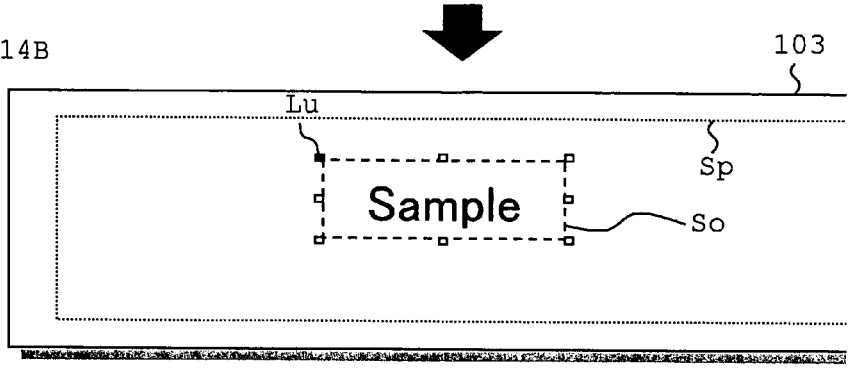

A display example of a case where the first reference position has not been defined, that is, a case where the operator did not arrange the object area So at a corner or on a line of the printable area Sp is described by using FIG. 14. In this example, as shown in FIG. 14A, because the operator has arranged the object area So at the center of the printable area Sp, none of the corners of the object area So match the corners of the printable area Sp, and none of the lines comprising the outer edges of the object area So match the lines comprising the outer edges of the printable area Sp. Thus, since the first reference position is not defined, the condition is not satisfied in step S110 of FIG. 8, and the reference position is automatically set to the second reference position in step S120. In this example, the operator has not manually set a second reference position, and thus the initial setting of the upper left corner (equivalent to the reference point Lu in the figure) of the object area So becomes the second reference position (indicated by a black square in the figure). As a result, the resetting in association with the scaling (reduction in this example) of the object area So is performed on the basis of the upper left corner and, as shown in FIG. 14B, the object area So is scaled (reduced in this example) on the basis of the reference point Lu.

In the embodiment described above, when producing a print label L, the operator can edit the print contents for the cover film 103 using the operation part 118b of the PC 118, and then confirm the print image to be printed by the print head 23 by the display of the display part 118a. At this time, with the text that is the print object already set within the printable area Sp of the cover film 103, the operator sometimes performs an editing operation that scales (enlarges or reduces) that text using the operation part 118b. In such a case in the present embodiment, the control circuit 130 of the PC 118 determines whether or not the object area So comprises a first reference position for scaling the object area So with respect to the printable area Sp, based on the location of the object area So, that includes the text, within the printable area Sp. Then, in a case where the decision is made that the object area So comprises the first reference position, the control circuit 130 performs resetting so that the object area So is scaled on the basis of the first reference position, in accordance with the scaling operation of the print object performed by the operator using the operation part 118b.

With this arrangement, in a case where the original position setting of the object area So in the printable area Sp is analogous to a setting based on some type of reference set by the operator (for example, a left alignment reference, right alignment reference, upper alignment reference, lower alignment reference, upper left alignment reference, lower left alignment reference, upper right alignment reference, or lower right alignment reference), it is possible to automatically execute scaling in a form that complies with that reference and is in accordance with the intention of the operator. As a result, the operator no longer needs to correct the position of the object area So after scaling as in a case where scaling is performed using a reference position that conflicts with the intention of the operator, thereby reducing the operation work load of the operator and improving user friendliness.

Further, particularly in the present embodiment, the scaling operation includes operations that enlarge and reduce text (including the object area So) vertically or horizontally, or operations that change the text font (font, style, size, etc.), performed using the operation part 118b. With this arrangement, when the print object is text and the text is enlarged or reduced in the vertical or horizontal direction or subjected to a font change, scaling of the object area So can be executed accordingly on the basis of the first reference position. Furthermore, when the print object is an image such a photograph or picture or a graphic such as a barcode, the scaling operation includes operations that enlarge and reduce the image or graphic in the vertical and horizontal directions. With this arrangement, when the print object is a graphic or image and the graphic or image is enlarged or reduced in the vertical or horizontal direction, scaling of the object area So can be executed accordingly on the basis of the first reference position.

Further, particularly in the present embodiment, in a case where the position of a corner of the object area So matches the position of a specific corner of the printable area Sp, the corner of the object area So is defined as the first reference position. With this arrangement, in a case where the original position setting of the object area So in the printable area Sp is analogous to an operator setting that sets a specific corner as a reference (an upper left reference, upper right reference, lower left reference, lower right reference, etc.), it is possible to execute scaling in a form that complies with that reference and is in accordance with the intention of the operator. As a result, the operation work load of the operator is reduced, thereby enhancing user-friendliness.

Further, particularly in the present embodiment, in a case where the distance between the position of a corner of the object area So and the position of a specific corner of the printable area Sp is within a predetermined first threshold value, the corner of the object area So is defined as the first reference position. With this arrangement, even in a case where the corners do not completely match due to an operation error by the operator, etc., the reference intention of the operator is reliably analogized, making it possible to execute scaling in a form that is in accordance with the intention.

Further, particularly in the present embodiment, the configuration makes it possible to set a second reference position for the printable area Sp of the object area So for scaling, separately from the decision of the first reference position, using the operation part 118b of the PC 118. With this arrangement, the reference position for scaling the object area So can be set by a manual operation performed by the operator in advance.

Further, particularly in the present embodiment, the PC 118 comprises a configuration that makes it possible to switch the mode to an automatic setting mode in which the object area So is scaled and reset on the basis of an automatically set reference position (first reference position, second reference position, or third reference position), or to a manual setting mode in which the object area So is scaled and reset on the basis of a second reference position set by the operation part 118b. With this arrangement, the mode is switched in accordance with application and need, making it possible to separate use for cases where the reference position setting is preferably based on a manual operation of the operator, and for cases where the reference position setting is preferably based on an automatic setting. As a result, user-friendliness is further improved.

Further, particularly in the present embodiment, in a case where a line comprising an outer edge of the object area So is defined as the first reference position, a third reference position is set in a form that utilizes the first reference position that is based on an automatic setting and the second reference position that is based on a manual operation performed by the operator, and scaling is executed on the basis of the third reference position. With this arrangement, scaling that more reliably reflects the intention of the operator can be achieved.

Further, particularly in the present embodiment, in a case where the distance between the position SoL or SoU of a line comprising an outer edge of the object area So and a specific line SpL or SpU comprising an outer edge of the printable area Sp is within a predetermined second threshold value, the line of the object area So is defined as the first reference position.

With this arrangement, in a case where the original position setting of the object area So in the printable area Sp is analogous to an operator setting that sets a specific line as a reference (a left alignment reference, right alignment reference, upper alignment reference, lower alignment reference, etc.), it is possible to automatically set that specific line as a midstage first reference position for setting a final third reference position that is to be used when the object area So is scaled. With this arrangement, even in a case where the lines do not completely match due to an operation error by the operator, etc., the reference intention of the operator is reliably analogized, making it possible to set the first reference position in a form that is in accordance with that intention. Accordingly, it is possible to execute scaling in a form that complies with the reference and is in accordance with the intention of the operator. As a result, the operation work load of the operator is reduced, thereby enhancing user-friendliness.

Note that various modifications may be made according to the present embodiment without departing from the spirit and scope of the disclosure, in addition to the above embodiment. Description will be made below regarding such modifications.

(1) When the Center of the Label is Set as the First Reference Position

While in the above embodiment the configuration makes it possible to only define corners (four corners) of the object area So or lines (four sides) comprising the outer edge of the object area So as a first reference position, the present disclosure is not limited thereto and the center position of the print label L may be defined as the first reference position. By its very nature, this modification is geared toward a case where the label length is the aforementioned fixed length.

Figure 15A:
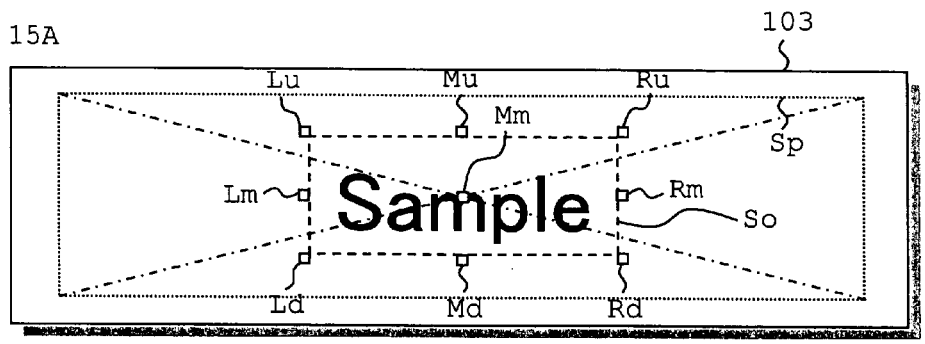
FIG. 15 is a diagram illustrating an example of a display of the display part of the PC when a scaling operation is performed in a case where the operator has arranged the object area at the center position of the printable area, in a modification wherein the center position of the print label can be defined as the first reference position.
Figure 15B:
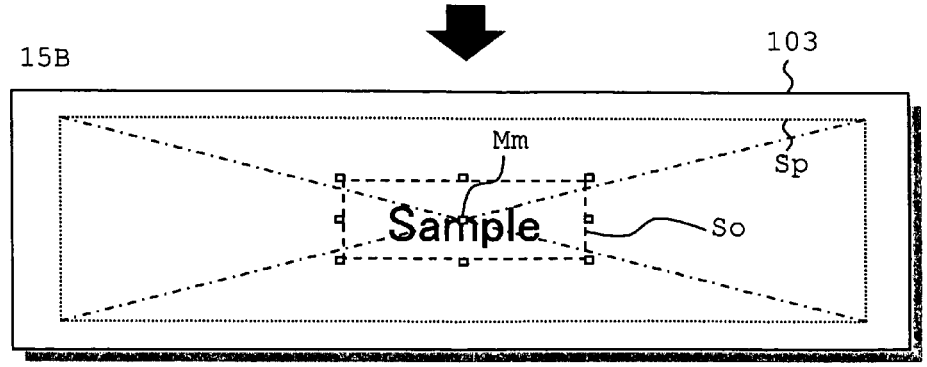

A diagram that illustrates an example of a display of the display part 118a of the PC 118 when the operator has performed a scaling operation on the object area So in the present modification is described by using FIG. 15. As shown in FIG. 15A, the operator has arranged the object area So at the center of the printable area Sp. With this arrangement, because the center position (equivalent to the reference point Mm in the figure) of the object area So matches the center position of the printable area Sp, the center of the object area So is defined as the first reference position. Then, the reference position is automatically set to the center of the object area So, which is the first reference position. As a result, when the resetting associated with the scaling (reduction in this example) of the object area So is performed on the basis of the center reference point Mm, as shown in FIG. 15B, the object area So is scaled (reduced in this example) while maintaining the arrangement of the object area So at the center with respect to the printable area Sp.

Note that the present modification, similar to the above embodiment, is not limited to a case where the position of the center of the object area So completely matches the position of the center of the printable area Sp, but preferably includes cases where the distance between the two is within a predetermined threshold value (set to a suitable value in advance) as matching cases.

According to this modification, it is possible to execute scaling in a form that complies with the center alignment reference of the object area So intended by the operator, in accordance with that intention. As a result, similar to the above embodiment, the operation work load of the operator is reduced, thereby enhancing user-friendliness.

(2) Other

While in the above, the PC 118, which is a separate unit from the label producing apparatus 1, is used as the print label editing apparatus, the present disclosure is not limited thereto. The edit screen and operation part may be integrated with the label producing apparatus 1, and the integrated unit may be employed as the print label editing apparatus.

Further, while the above has been described in connection with an illustrative scenario in which the label tape 109 with print is cut by the cutting mechanism 15 so as to produce the print label L, the present disclosure is not limited thereto. That is, in a case where a label mount (a so-called die cut label) separated in advance to a predetermined size corresponding to the label is continuously disposed on the tape fed out from the roll, the present disclosure may also be applied to a case where the label is not cut by the cutting mechanism 15 but rather the label mount (a label mount on which corresponding printing has been performed) only is peeled from the tape after the tape has been discharged from the label discharging exit 11 so as to form the print label L.

While the above employs a method (so-called laminated method) wherein printing is performed on the cover film 103 separate from the base tape 101 and then the two are bonded together, the present disclosure is not limited thereto. For example, the present disclosure may also be applied to a method (so-called non-laminated type that does not perform bonding) wherein printing is performed on the print-receiving tape layer (thermal layer, etc.) provided to the base tape (thermal tape, etc.).

Furthermore, while the above has been described in connection with an illustrative scenario where the base tape 101 is wound around a reel member 102a so as to form a first roll 102, and that first roll 102 is disposed within the cartridge 7, and hence the base tape 101 is fed out from the cartridge 7, the present disclosure is not limited thereto. For example, an arrangement can be made as follows. Namely, a long-length or rectangular tape or sheet (including tape cut to a suitable length after being supplied from a roll) is stacked (laid flat and layered into a tray shape, for example) in a predetermined housing part so as to form a cartridge. The cartridge is then mounted to the cartridge holder provided to the label producing apparatus. Then, the tape or sheet is supplied or fed from the housing part, and printing or writing is performed so as to produce print labels L.

Furthermore, a configuration wherein the above-described roll is directly removably loaded to the label producing apparatus side, or a configuration wherein a long, flat paper-shaped or strip-shaped tape or sheet is moved one piece at a time from outside the label producing apparatus by a predetermined feeder mechanism and supplied to within the label producing apparatus are also possible. Additionally, the structure of the roll is not limited to a type that is removable from the label producing apparatus main body, such as the cartridge 7, but rather the first roll 102 may be provided as a so-called installation type or an integrated type that is not removable from the apparatus main body side. In each of these cases as well, the same advantages are achieved.

Note that the arrow shown in each figure, such as FIG. 4, in the above denotes an example of signal flow, but the signal flow direction is not limited thereto.

Also note that the present disclosure is not limited to the procedures shown in the flowcharts of FIG. 7, FIG. 8, FIG. 9, etc., and procedure additions and deletions as well as sequence changes may be made without departing from the spirit and scope of the disclosure.

Additionally, other than those previously described, approaches according to the respective embodiments and exemplary modifications may be utilized in combination as appropriate.

What is claimed is:

1. A print label editing apparatus comprising:
   an operation device that enables an operator to edit print contents to be printed by a printing device on a printable area of a print-receiving tape for producing print labels;
   a display device that displays a print image to be printed by said printing device on said print-receiving tape;
   a reference position setting portion that automatically sets a scaling reference position on the basis of a correlation of a specific portion of an object area with respect to a specific portion of said printable area, the scaling reference position becoming a standard for the scaling of the said object area when a scaling operation that enlarges or reduces a print object in said object area preset in said printable area has been performed by said operation device; and
   an object resetting portion that scales and resets said object area by using said scaling reference position as a standard in a case where a scaling operation that enlarges or reduces said print object has been performed by said operation device, wherein
   said reference position setting portion automatically sets a corner of said object area as said scaling reference position in a case where a position of the corner of said object area overlaps a position of a specific corner of said printable area, and
   said object resetting portion enlarges or reduces said object area while not moving said corner of said object area.

2. The print label editing apparatus according to claim 1, further comprising a scaling determining portion that determines whether or not said scaling operation for said print object was performed by said operation device; wherein:
   said object resetting portion scales and resets said object area by using said scaling reference position as a standard in a case where said scaling determining portion has determined that said scaling operation was performed.

3. The print label editing apparatus according to claim 2, wherein:
   said print object is text; and
   said scaling determining portion determines whether or not said text has been enlarged or reduced in a vertical or horizontal direction, or whether or not the font has been changed by said operation device as said scaling operation.

4. The print label editing apparatus according to claim 2, wherein:
   said print object is a graphic or an image; and
   said scaling determining portion determines whether or not said graphic or said image has been enlarged or reduced in a vertical or horizontal direction by said operation device as said scaling operation.

5. The print label editing apparatus according to claim 1, wherein:
   said reference position setting portion automatically sets a corner of said object area as said scaling reference position in a case where a distance between a position of a corner of said object area and a position of a specific corner of said printable area is within a predetermined first threshold value.

6. A non-transitory computer readable recording medium recording a program for a calculation device to perform steps, said calculation device included in print label editing apparatus having operation device, said operation device that enables an operator to edit print contents to be printed by printing device of print label producing apparatus on a print-receiving tape, said steps comprising:
   a reference position determining step for determining whether or not a first reference position in a printable area for an object area exists, based on a preset position of said object area, said object area including a print object within said printable area of said printing device for said print-receiving tape; and
   an object resetting step for scaling and resetting said object area by using said first reference position as a standard in a case where it has been determined that said first reference position exists by said reference position determining step and a scaling operation that enlarges or reduces said print object has been performed by said operation device, wherein a defined corner of said object area comprises said first reference position in said reference position determining step in a case where a position of a corner of said object area matches a position of a specific corner of said printable area.

7. The recording medium according to claim 6, said steps further comprising a scaling determining step for determining whether or not said scaling operation for said print object was performed by said operation device; wherein:
   said object area is scaled and reset by using said first reference position as a standard in said object resetting step in a case where it has determined that said first reference position exists in said reference position determining step and it has determined that said scaling operation was performed in said scaling determining step.

8. The recording medium according to claim 7, wherein:
   said print object is text; and
   it is determined whether or not said text has been enlarged or reduced in a vertical or horizontal direction, or whether or not the font has been changed by said operation device as said scaling operation in said scaling determining step.

9. The recording medium according to claim 7, wherein:
   said print object is a graphic or an image; and
   it is determined whether or not said graphic or said image has been enlarged or reduced in a vertical or horizontal direction by said operation device as said scaling operation in said scaling determining step.

10. The recording medium according to claim 7, said steps further comprising a step for enabling said operation device to set a second reference position in said printable area for said object area for scaling, separately from the decision of said first reference position determined in said reference position determining step.

11. The recording medium according to claim 10, said steps further comprising a step for enabling an operator to edit with a first mode or a second mode selectively, said object area is scaled and reset in said object resetting step in said first mode by using said first reference position determined in said reference position determining step as a standard, said object area is scaled and reset in said object resetting step in said second mode by using said second reference position set by said operation device as a standard.

12. The recording medium according to claim 10, wherein: a line consisting an outer edge of said object area is defined as said first reference position in said reference position determining step in a case where said line consisting the outer edge of said object area matches a specific line consisting an outer edge of said printable area; and said object area is scaled and reset in said object resetting step by using a third reference position as a standard in a case where it has defined the line consisting an outer edge of said object area as said first reference position in said reference position determining step and said operation device has set said second reference position, said third reference position set based on said first reference position and said second reference position.

13. The recording medium according to claim 12, wherein: the line consisting an outer edge of said object area is defined as said first reference position in said reference position determining step in a case where a distance between the line consisting an outer edge of said object area and said specific line consisting an outer edge of said printable area is within a predetermined second threshold value.

14. The recording medium according to claim 6, wherein: a corner of said object area is defined as said first reference position in said reference position determining step in a case where a distance between a position of a corner of said object area and a position of a specific corner of said printable area is within a predetermined first threshold value.

15. A print label editing apparatus comprising:
an operation device that enables an operator to edit print contents to be printed by a printing device on a printable area of a print-receiving tape for producing print labels;
a display device that displays a print image to be printed by said printing device on said print-receiving tape;
a reference position setting portion that automatically sets a scaling reference position on the basis of a correlation of a specific portion of an object area with respect to a specific portion of said printable area, the scaling reference position becoming a standard for the scaling of said object area when a scaling operation that enlarges or reduces a print object in said object area preset in said printable area has been performed by said operation device; and
an object resetting portion that scales and resets said object area by using said scaling reference position as a standard in a case where a scaling operation that enlarges or reduces said print object has been performed by said operation device, wherein said operation device is configured so as to enable the manual setting of a reference position in said printable area for said object area for scaling, separately from the automatically setting of said scaling reference position set by said reference position setting portion,
said reference position setting portion automatically sets a line consisting an outer edge of said object area as said scaling reference position in a case where said line consisting the outer edge of said object area overlaps a specific line consisting an outer edge of said printable area, and
said object resetting portion enlarges or reduces said object area while not moving another new reference position set on an end in a side near said reference position among both ends of the line set as said scaling reference position in a case where said reference position setting portion has automatically set the line consisting the outer edge of said object area as said scaling reference position and said operation device has set said reference position.

16. The print label editing apparatus according to claim 15, performs editing with a first mode or a second mode selectively, said object resetting portion scaling and resetting said object area in said first mode by using said scaling reference position automatically set by said reference position setting portion as a standard, said object resetting portion scaling and resetting said object area in said second mode by using said reference position set by said operation device as a standard.

17. The print label editing apparatus according to claim 15, wherein:
said reference position setting portion automatically sets the line consisting an outer edge of said object area as said scaling reference position in a case where a distance between the line consisting an outer edge of said object area and said specific line consisting an outer edge of said printable area is within a predetermined second threshold value.

18. A print label editing apparatus comprising:
an operation device that enables an operator to edit print contents to be printed by a printing device on a printable area of a print-receiving tape for producing print labels;
a display device that displays a print image to be printed by said printing device on said print-receiving tape;
a reference position setting portion that automatically sets a scaling reference position on the basis of a correlation of a specific portion of an object area with respect to a specific portion of said printable area, the scaling reference position becoming a standard for the scaling of said object area when a scaling operation that enlarges or reduces a print object in said object area preset in said printable area has been performed by said operation device; and
an object resetting portion that scales and resets said object area by using said scaling reference position as a standard in a case where a scaling operation that enlarges or reduces said print object has been performed by said operation device, wherein
said reference position setting portion automatically sets a center of said object area as said scaling reference position in a case where a position of the center of said object area overlaps a position of a center of said printable area, and
said object resetting portion enlarges or reduces said object area while not moving said center of said object area.

\* \* \* \* \*